US006789785B2

(12) United States Patent
Hung

(10) Patent No.: US 6,789,785 B2
(45) Date of Patent: Sep. 14, 2004

(54) HYDRAULIC LIFTING DEVICE WITH A RAPID MECHANICAL LIFT TO CHASSIS OF VEHICLE

(75) Inventor: Victor Hung, Lu Chu Hsiang (TW)

(73) Assignee: Shinn Fu Corporation (TW)

( * ) Notice: Subject to any disclaimer, the term of this patent is extended or adjusted under 35 U.S.C. 154(b) by 0 days.

(21) Appl. No.: 10/052,634

(22) Filed: Jan. 23, 2002

(65) Prior Publication Data

US 2003/0136951 A1 Jul. 24, 2003

(51) Int. Cl.[7] .................................................. B60P 1/48
(52) U.S. Cl. ...................................................... 254/8 B
(58) Field of Search ................................ 254/8 B, 8 R, 254/8 C, 122, 124, 131, 1, 93 H

(56) References Cited

U.S. PATENT DOCUMENTS 3,220,698 A * 11/1965 Carder ....................... 254/122
4,850,568 A * 7/1989 Hung ......................... 254/8 B
5,131,501 A * 7/1992 Yoshikawa .................. 254/8 C
5,135,200 A * 8/1992 Neibrandt .................. 254/131
6,302,378 B1 * 10/2001 Koch et al. ................ 254/131

* cited by examiner

*Primary Examiner*—Robert C. Watson
(74) *Attorney, Agent, or Firm*—Bacon & Thomas, PLLC

(57) ABSTRACT

A hydraulic lifting device capable of being rapidly raised in a mechanical movement by use of a linkage mechanism that comprises a lifting device, a rotating shaft and a linkage. The lifting device has a basic construction of two vertical side plates, a lifting arm, and a saddle support plate at the front end of the lifting arm. An outer end of the saddle support plate has an axial rod at a predetermined position. The rotating shaft extends through a clearance hole in the vertical side plate of the lifting device. The rotating shaft is integrally attached to the linkage, and the linkage has two extreme ends which are integrally attached to both the rotating shaft and the axial rod in the saddle support arm. By the above components and mechanical assembly, as the rotating shaft is rotated the linkage is driven through the axial rod in the saddle support plate and the lifting arm is rapidly raised in a mechanical movement, not a hydraulic movement, to the support point of the vehicle to be lifted by a secondary hydraulic action.

11 Claims, 12 Drawing Sheets

HYDRAULIC LIFTING DEVICE WITH A RAPID MECHANICAL LIFT TO CHASSIS OF VEHICLE

BACKGROUND OF THE INVENTION (a) Field of the Invention

The present invention relates to a hydraulic lifting device which has a rapid mechanical lift which quickly raises the lifting arm/saddle of the unit to the chassis of a vehicle, prior to the use of the hydraulic lifting mechanism in lifting the vehicle off the ground.

(b) Description of the Prior Art

The prior art lifting devices, such as floor jacks or garage jacks utilize a handle tube which is inserted into a pump piston sleeve. The handle is then moved vertically up and down to drive the piston into pressuring the hydraulic fluid. Thereby the lifting arm moves up slowly with high hydraulic energy to lift the vehicle. Prior to this high pressure lifting of the vehicle, the lifting arm has to be positioned and contacted with the lifting point of the vehicle and this is also done by the vertical up and down operation of the handle. During this preset of the lifting arm, the same lifting arm moves slowly up and the handle has to be moved vertically up and down many times, depending on the normal height of the vehicle lifting point. This is a slow, inefficient and energy wasting process especially when the consumer is making emergency repairs on the road, or in a commercial garage setting. U.S. patent Ser. Nos. 09/146,432, 09/766, 620, etc of the present invention disclose prior ideas on improving this preset of the lifting arm into position. However these ideas have a more complicated mechanism and hydraulic system to quickly move the lifting arm into preset position, and therefore the structure is complicated, costly and needs precision manufacturing controls.

SUMMARY OF THE INVENTION

The primary object of the present invention, is to provide a lifting device with a quicker preset mechanism, to get the lifting arm in correct position in a more efficient manner. This is accomplished utilizing a linkage attached to the saddle support arm and to a swiveling pedal attached to a lower position on the lifting arm. By the pressure on the pedal, the shaft that is attached to the lower position of the linkage is rotated thus moving the lifting arm up quickly into preset position required.

Another object of the present invention in providing a lifting device with a quicker preset mechanism that gets the lifting arm in correct in correct position in a more efficient manner is accomplished by attaching a clevis type lifting handle which is attached to the same mechanism in line with the foot pedal. This gives the consumer the choice of moving the lifting arm quickly into position by either the side foot pedal or the lifting handle.

A further object of the present invention in providing a lifting device with a quicker preset mechanism that moves the lifting arm into correct position in a more efficient manner is accomplished by extending the rotating shaft outboard of the side plate and incorporating a locating hole positioned trans-axially.

An auxiliary rod or handle is inserted into this hole and by a downward movement of the handle the rotating shaft is rotated as needed to quickly move the lifting arm into correct position.

A further object of the present invention is to provide a lifting device with a quicker preset mechanism that moves the lifting arm into correct position in a more efficient manner, is accomplished by a combination of the foot pedal and lifting arm above, wherein both the foot pedal and the lifting handle can be folding when not in use thus creating smaller unit dimensions for storage and shipping.

DETAILED DESCRIPTION OF THE PREFERRED EMBODIMENTS

Figure 12:
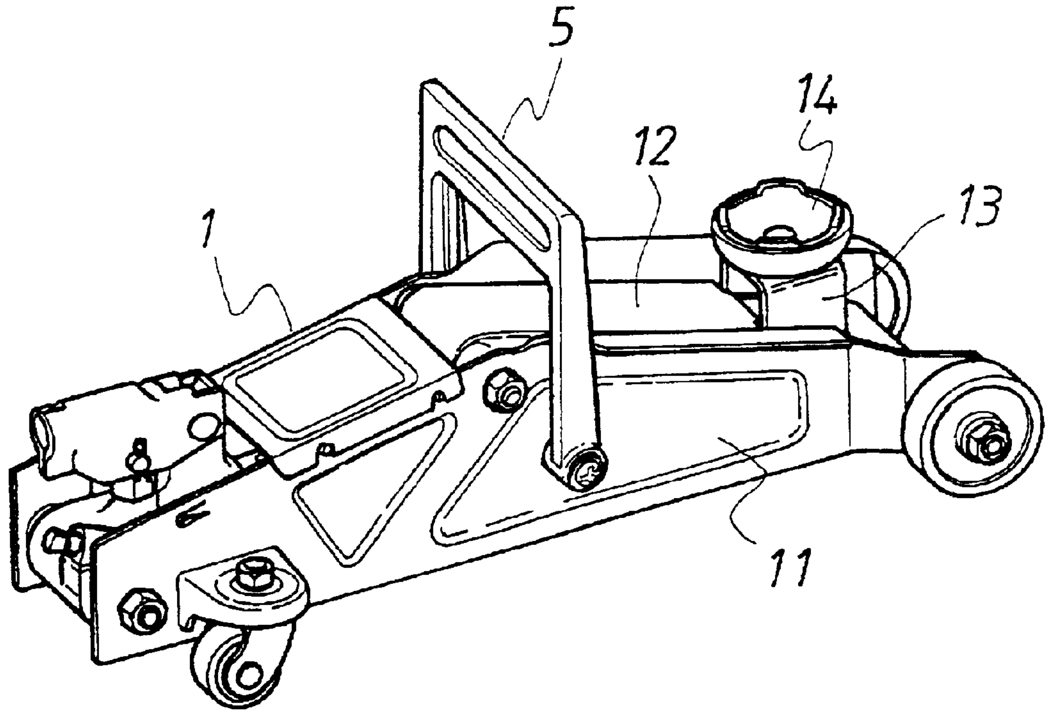
FIG. 12 is a perspective view showing the second embodiment of the present invention.

Referring to FIGS. 1 thru 5, the rapid preset of the lifting arm of the lifting device is illustrated. The present Invention mainly consists of a lifting device 1, a rotating shaft 2, and a linkage 3. The lifting device can have many different configurations from a small lower capacity consumer type jack (as FIG. 12) to a large higher capacity garage type jack (as FIG. 1) or any other prior art jack designs.

The jack consists of two vertical side plates 11, a lifting arm 12, and a saddle support arm 13 at the front end of the lifting arm. There is an axial rod 131 installed into the saddle support arm 13 at a predetermined position. The rotating shaft 2 protrudes through a clearance hole 15 in the vertical side plate 11 of the jack 1. The inner end of the rotating shaft 2 integrally attached to the linkage 3 and the protruding outer end of the rotating shaft is attached to a foot pedal 4 (referring to the first embodiment of the present invention as in FIG. 1) or to a carry handle 5 (referring to the second embodiment of the present invention as in FIG. 2). Tithe linkage has two extreme ends, one of which is attached to the rotating shaft 2 and the other is attached to the axial rod 131 in the saddle support arm 13.

Within the above mechanism, during the preset procedure, the rotating shaft moves the linkage 3 through an arc that lifts the lifting arm 12 of the jack up to its preset position in a rapid manner. (refer to FIG. 3)

In use, the rotating shaft may be combined with a foot pedal 4, allowing the user to use foot pressure on the pedal to rotate the rotating shaft 2 and thus through the linkage rapidly raise the lifting arm to its required preset position.

Figure 1:
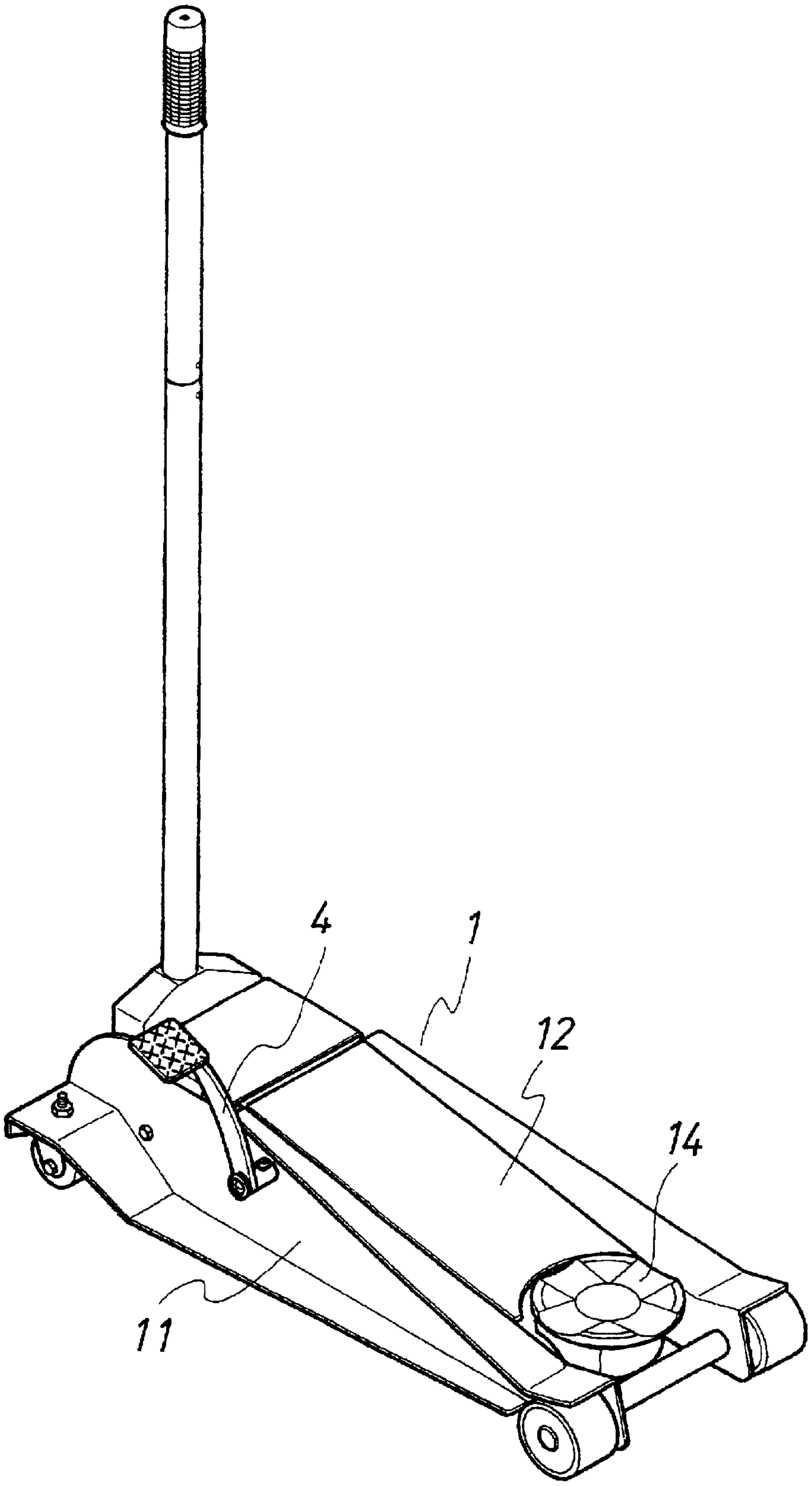
FIG. 1 is a perspective view of the present invention.
Figure 2:
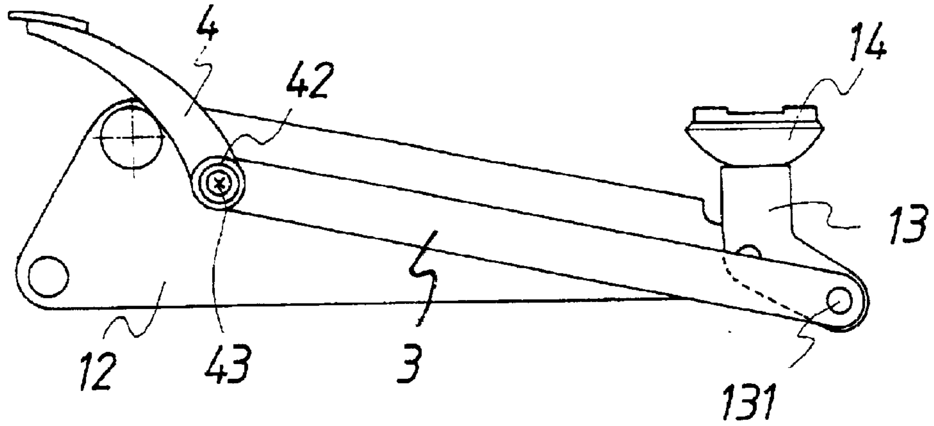
FIG. 2 is a schematic view showing the foot pedal in a ready to operate position.
Figure 3:
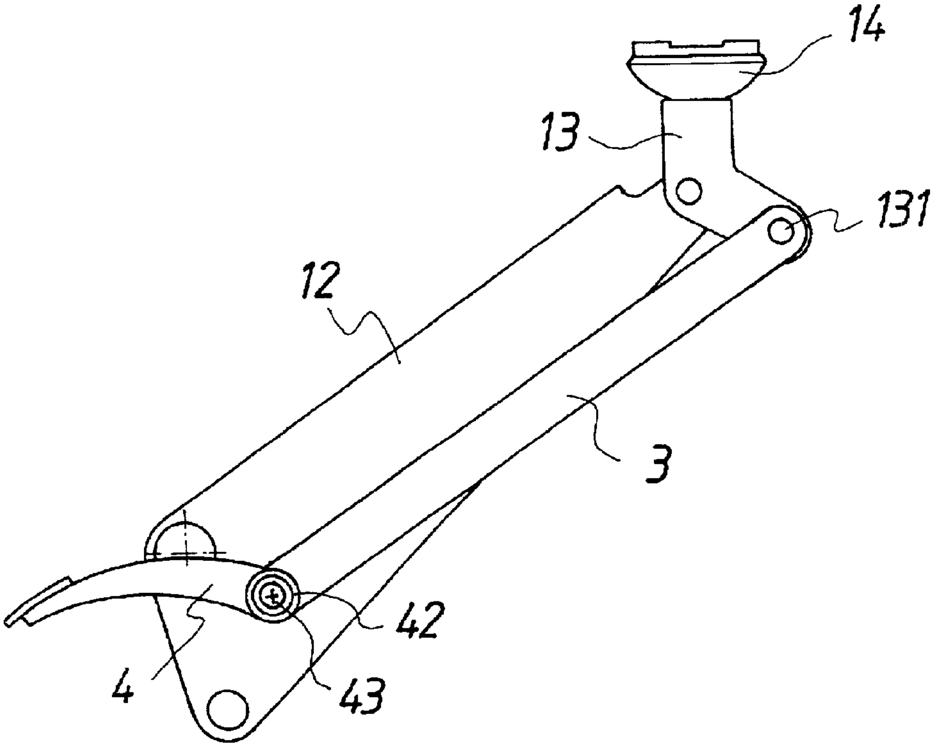
FIG. 3 is a schematic view showing the foot pedal after operation and the connected quick moving of the lifting arm into required preset position.
Figure 4:
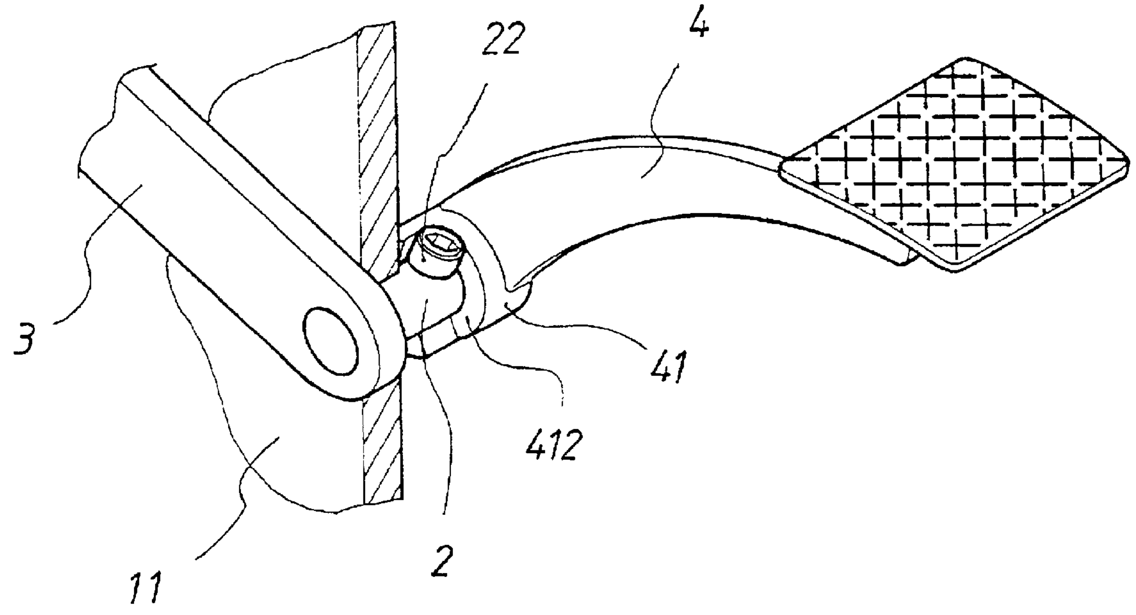
FIG. 4 is a cutaway view of the attachment of the foot pedal to the rotating shaft/linkage combination
Figure 5:
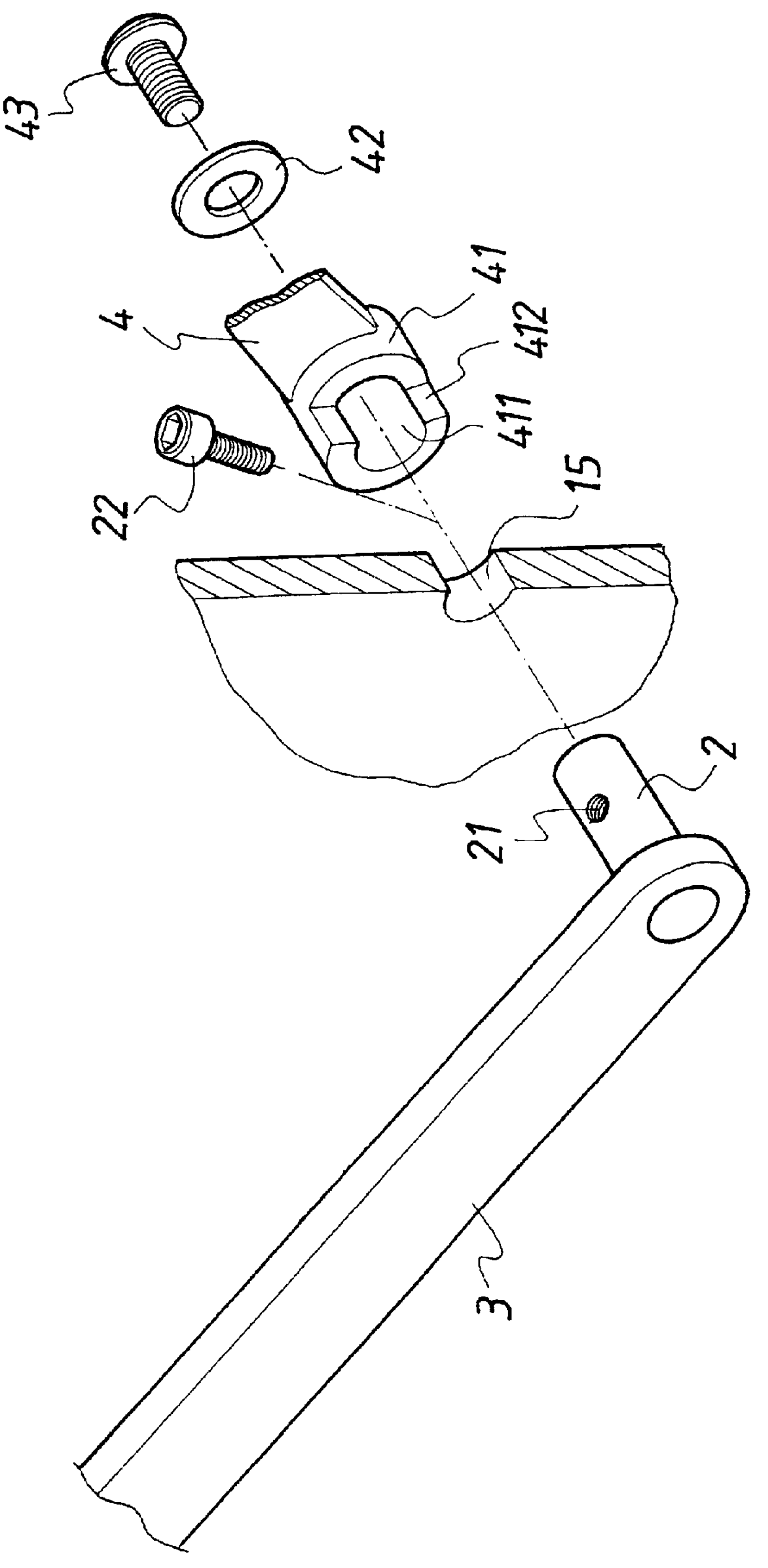
FIG. 5 is an exploded view of FIG. 4.
Figure 6:
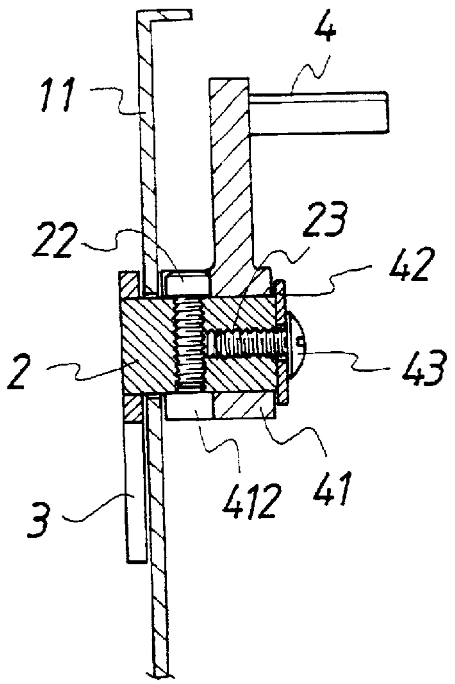
FIG. 6 is a cross sectional view of FIG. 4.
Figure 7:
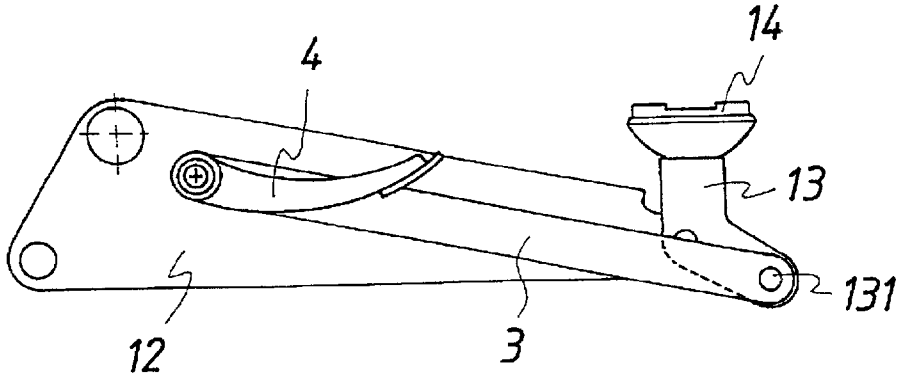
FIG. 7 is a cross sectional view of the foot pedal in a storage position.
Figure 8:
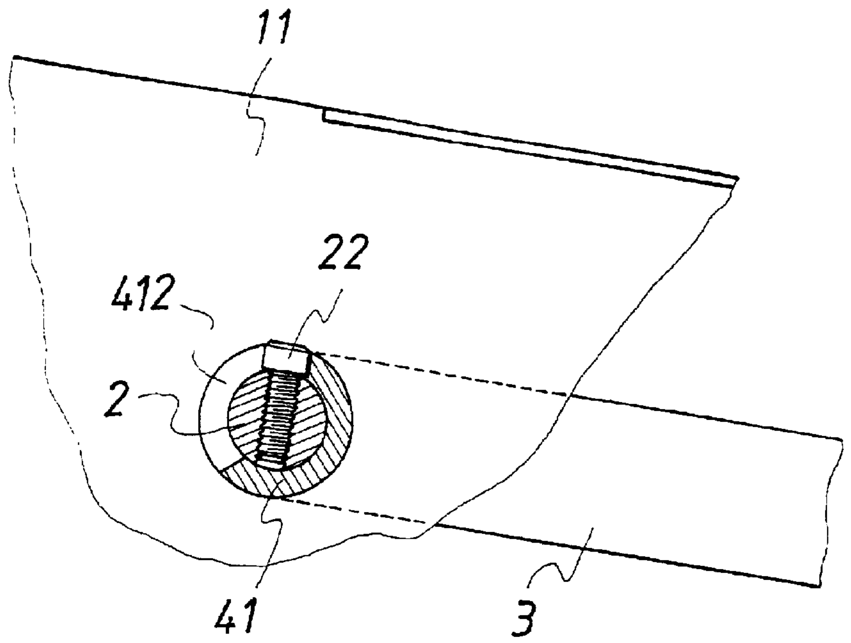
FIG. 8 is a partial schematic showing the rotating shaft/linkage combination in a pre-use position.
Figure 9:
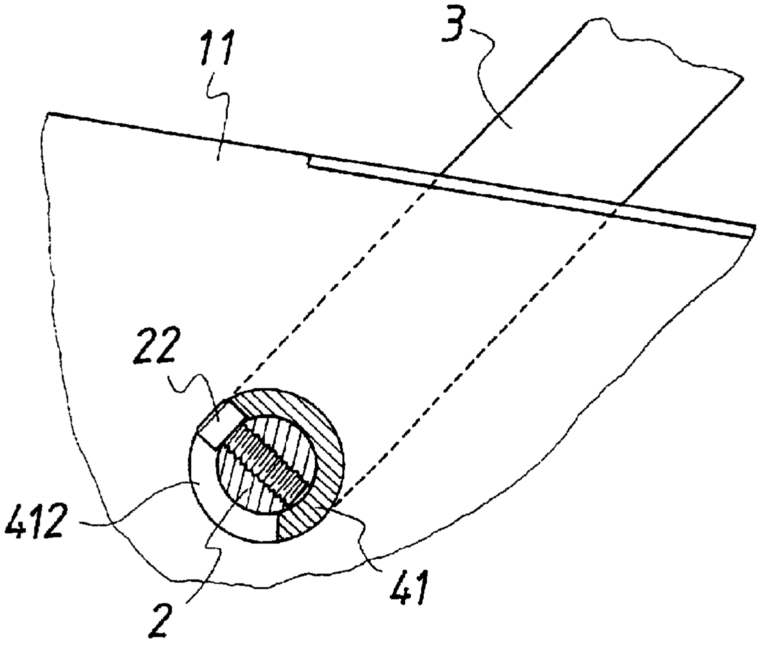
FIG. 9 is a partial schematic showing the rotating shaft/linkage combination in the preset ready to lift vehicle position.

Additionally, in reference to FIGS. 2 and 4, the above described rotating shaft 2 and foot pedal 4 can be connected together with a clockwise movement of the foot pedal still allowed for storage. One side of the rotating shaft 2 has a threaded hole (or a pin hole), thus allowing insertion of a screw (or a pin). The extreme outer end of the rotating shaft has a threaded hole 23 on its axis. One end of the foot pedal 4 has a post with a axial locating hole 411. The outer edge of this post has a predetermined angle closed end slot 412. In this assembly of the rotating shaft 2 and the foot pedal 4, the rotating shaft 2 protrudes through the post 41 and a washer is located against the outer face of the post 41. A screw 43 is then screwed into the post, through the washer, to fasten the rotating shaft 2 and foot pedal 4 together still allowing the pedal to rotate axially around the rotating shaft. A thread pin 22 (or drive pin) is then fitted into the body of the rotating shaft 2 through the slot 412 of the engaging post 41. This controls the foot pedal 4 to only move radially through the range of the slot 412. When not in use this allows the foot pedal 4 to be folded forward, the threaded pin 22 (or drive pin) stopping against the extreme end of the slot. As shown in FIG. 8, the foot pedal is in storage position. In use the pedal is moved back to start position, pressure is exerted on the foot pedal, the drive shaft rotates and in turn rapidly raises the lifting arm to its required preset position for lifting of vehicle (shown in FIG. 9)

Figure 10:
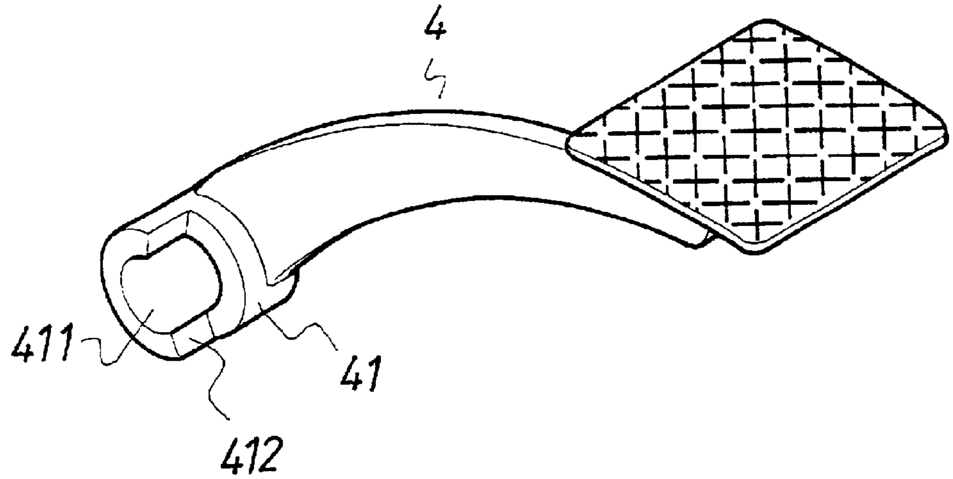
FIG. 10 is a perspective view of the pedal used in the first embodiment of the present invention.
Figure 11:
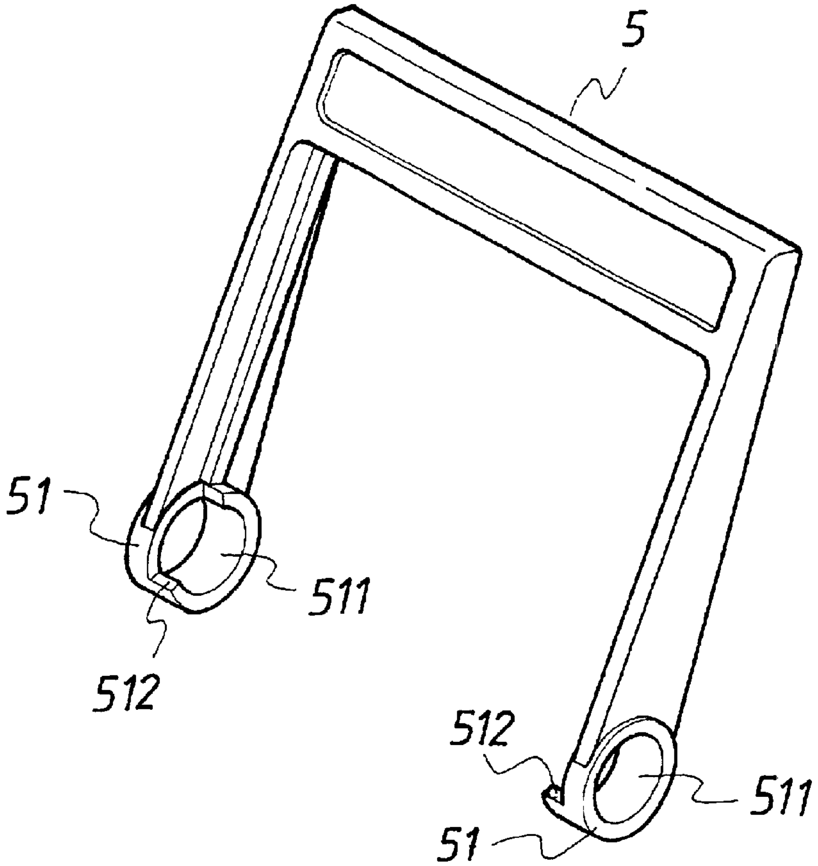
FIG. 11 is a perspective view of the lifting handle used in the first embodiment of the present invention.
Figure 13:
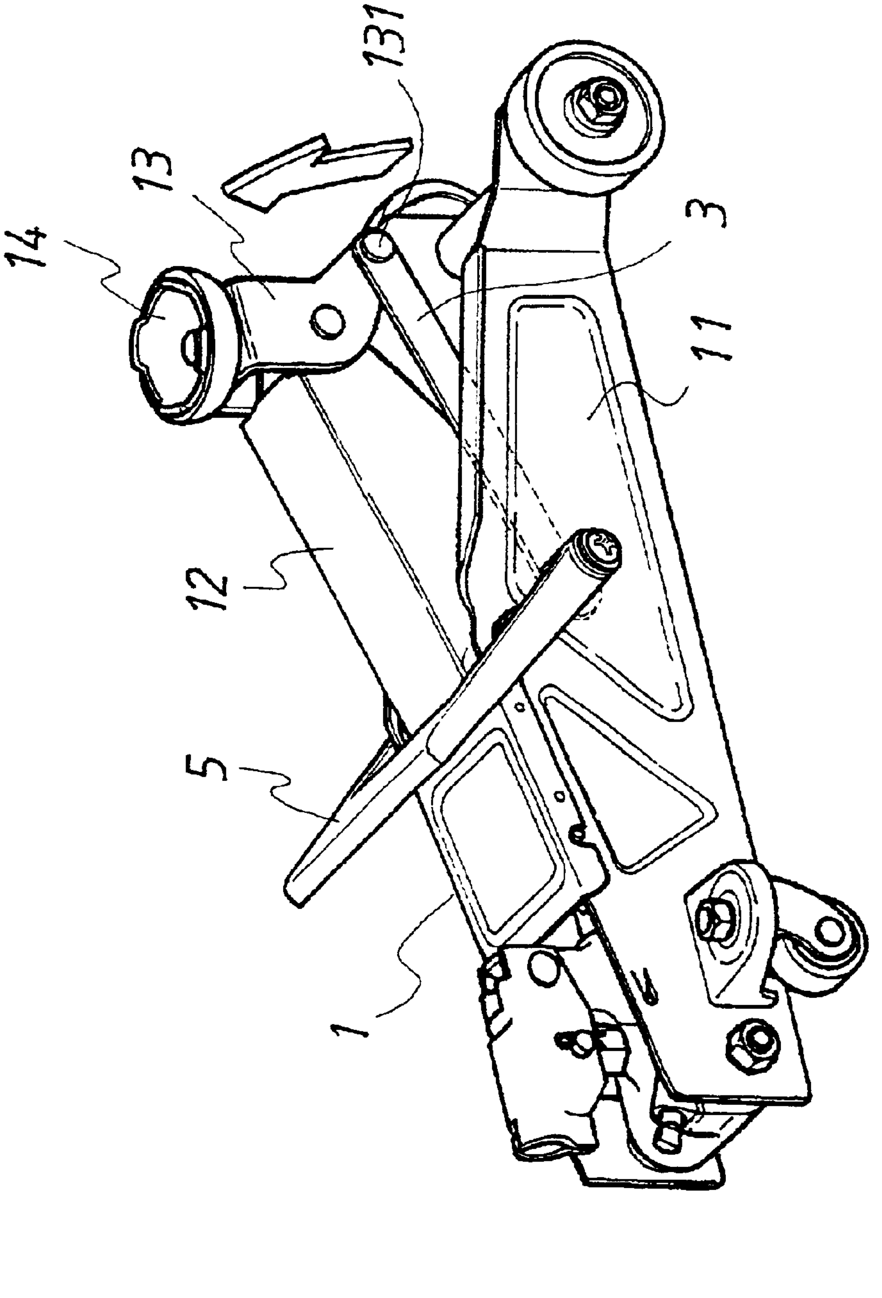
FIG. 13 is a schematic view showing the handle and lifting arm at the end of preset movement and the unit ready to lift vehicle.

Similarly, as part of the same present invention, a lifting handle 5 (FIGS. 5 and 12) can be substituted for the foot pedal 4 (FIG. 10). This lifting handle is attached to the rotating shaft in a similar way so that a pulling motion on the lifting handle 5, rotates the rotating shaft 2 which in turn rapidly raises the lifting arm to its same preset position for lifting of vehicle. The lifting handle 5 has a clevis shape that locates over the side frames. Each side of the lifting handle has engaging arms with posts 51. Each of these posts 51 has a similar design as the engaging post 41 on the foot pedal 4. That is, each post 51 on the arms has a central axial hole 511 and a closed predetermined angular slot 512. Thereby the lifting handle can be combined with the rotating shaft 2 on each side, which are connected to the two linkages 3, to coaxially combine the engaging posts 51 at each side. By pulling backwards on the lifting handle, the two rotating shafts 2 rotate and in turn rapidly lift the saddle support plate 13 to its required preset position for lifting of the vehicle. (as in FIG. 13).

Figure 14:
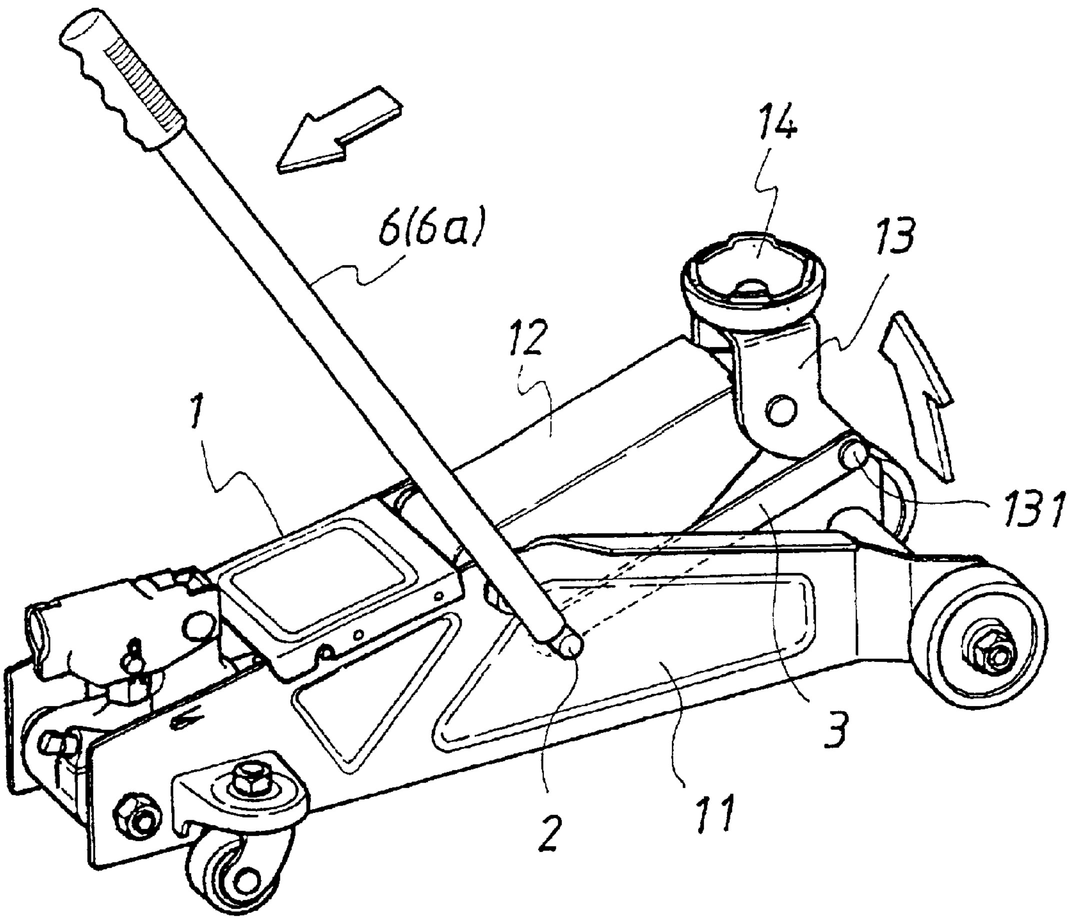
FIG. 14 is a schematic view showing the third embodiment of the present invention.
Figure 15:
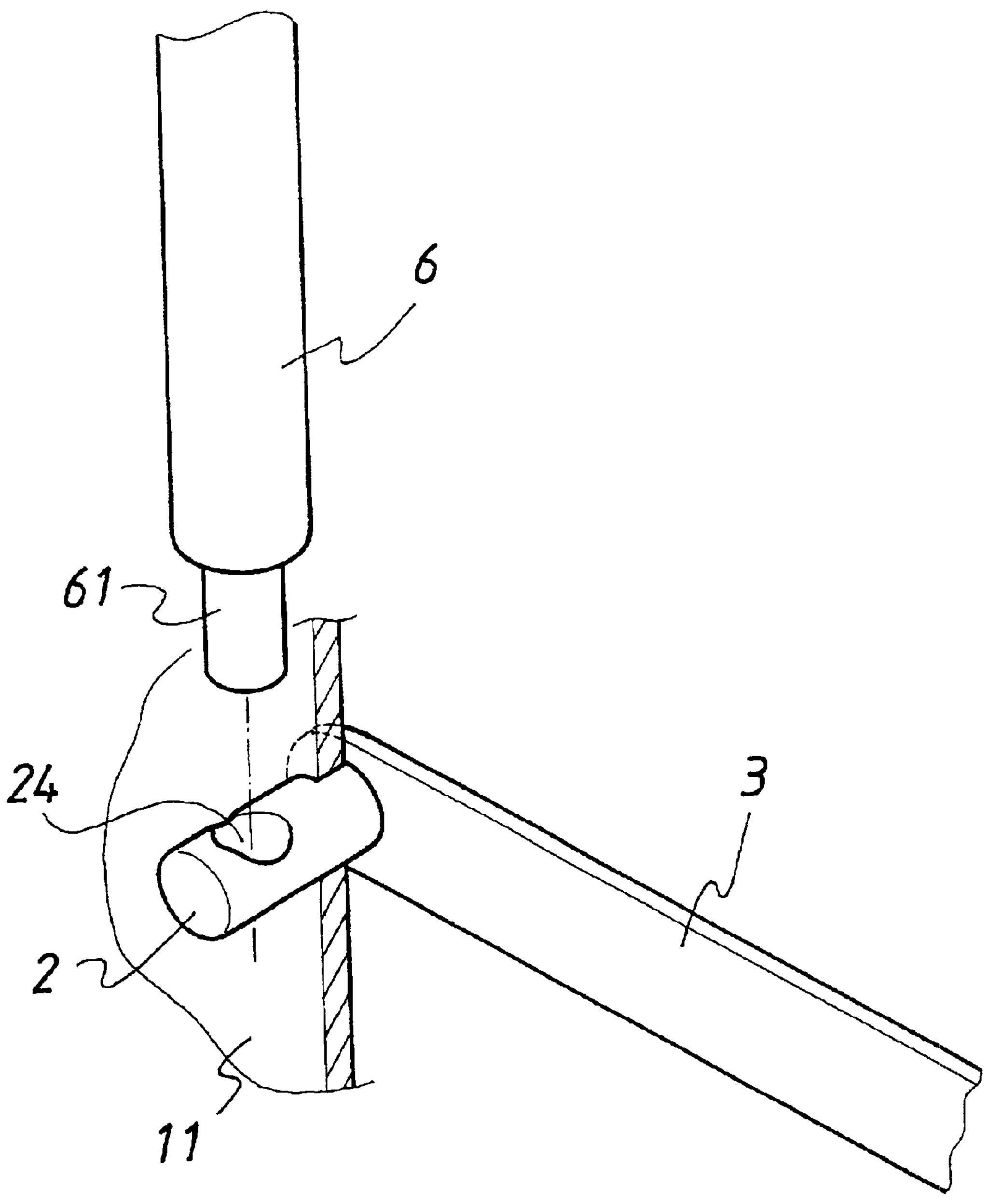
FIG. 15 is a partial schematic view showing the third embodiment of the present invention.
Figure 16:
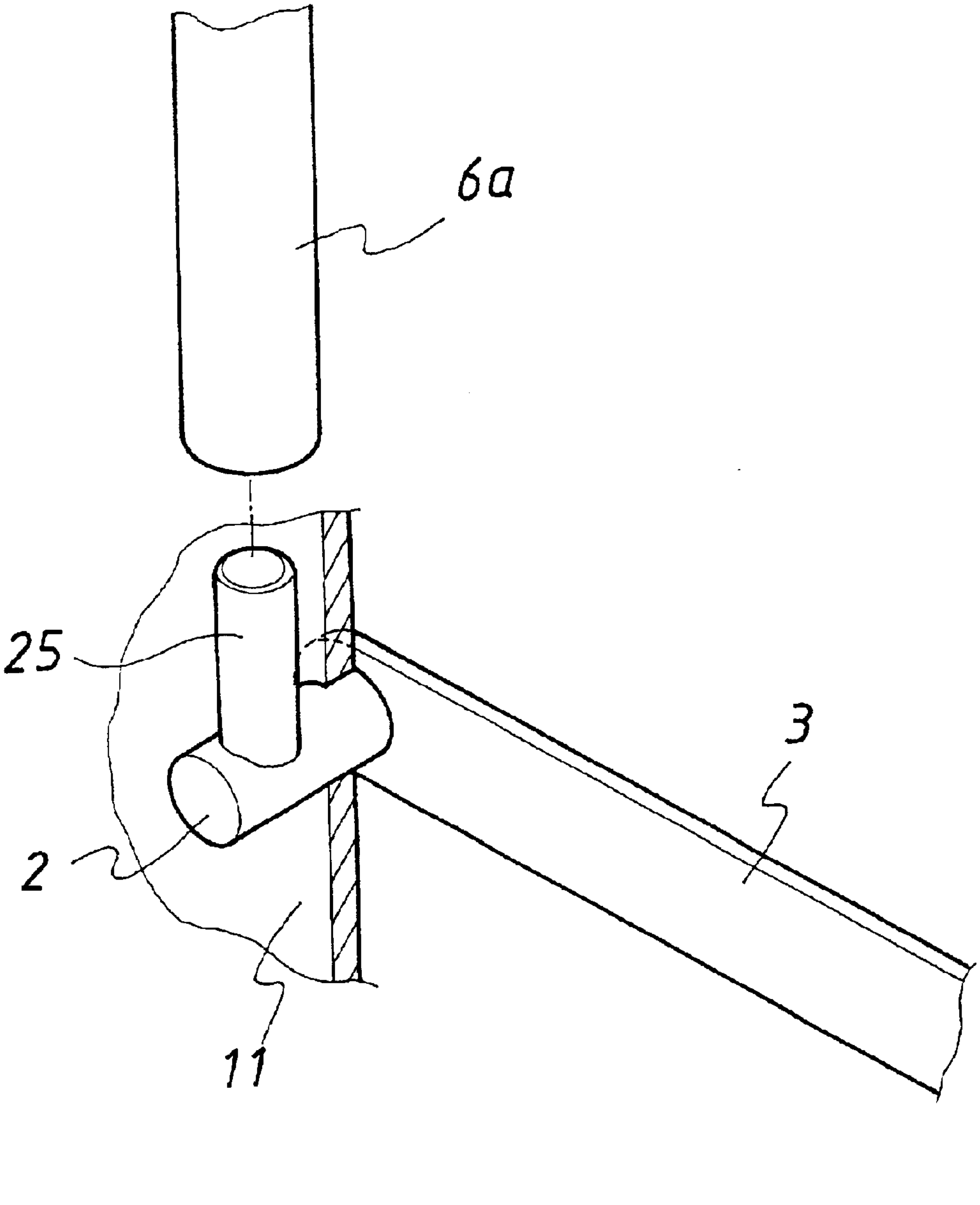
FIG. 16 is a partial schematic view showing another equivalent structure of the third embodiment of the present invention.

In the above embodiments a certain force is needed to rotate the rotating shaft 2 and in turn rapidly raise the lifting arm 12 and saddle support plate 13 to its required preset position for lifting of vehicle. Therefore in the third embodiments of FIGS. 14 and 15 the rotating shaft 2 has an outer extension with a cross-axial hole 24 in the extension. An auxiliary handle 6 with locator pin 61 at the front end, is located into this hole 24. Thereby pulling backwards on the handle 6, the rotating shaft is rotated and again the lifting arm is rapidly moved up to its required position, prior to lifting the vehicle. A variation on this third embodiment is shown in FIG. 16. In this variation, a protruding post 24 is at the extended end of the rotating, instead of the previous hole 24. In this design the auxiliary handle has an axial hole in the end instead of the locator pin 61. This hole fits over the post 24 and by pulling back on the handle, the arm is rapidly raised to the required position. Note in this embodiment, either of the two variables on the handle may be built into the main handle of the Jack 1 thus deleting need for an auxiliary handle.

Although the present invention has been described with reference to the preferred embodiments, it is obvious that the Be same invention may be varied in many ways. Such variations are not to be regarded as a departure from the spirit and scope of the present invention. All such modifications as would be obvious to one skilled in the art are intended to be included within the scope of the following claims.

What is claimed is:

1. A hydraulic lifting device that is rapidly lifted by a mechanical linkage to a lifting support point prior to using a hydraulic system to actually raise a vehicle, the lifting device comprising:

two vertical side plates, a lifting arm and a saddle support arm at a front end thereof;

a clearance hole through one of the vertical side plates at a predetermined position;

the saddle support arm has an axial rod at a predetermined position;

a rotating shaft protrudes through the clearance hole provided in one of the vertical side plates;

the rotating shaft is attached integrally with one end of the mechanical linkage and another end of the linkage is attached integrally with the axial rod on the saddle support arm;

when the rotating shaft is rotated, the linkage moves forward and the axial rod is rotated in the saddle support arm so that the lifting arm is rapidly raised through space to the lifting support point of the vehicle to be lifted by mechanical motion.

2. The hydraulic lifting device as claimed in claim 1, wherein an inboard section of the rotating shaft is attached integrally to the mechanical linkage, and an outboard section of the rotating shaft is integrally attached to a foot pedal.

3. A hydraulic lifting device capable of being rapidly raised in a mechanical movement by the use of a linkage mechanism as claimed in claim 2, wherein the inboard section of the rotating shaft is attached integrally to the linkage, and the outboard section of the rotating shaft is integrally attached to a lifting handle.

4. The hydraulic lifting device as claimed in claim 2, wherein the rotating shaft is movably attached to the foot pedal.

5. A hydraulic lifting device capable of being rapidly raised in a mechanical movement by the use of a linkage mechanism as claimed in claim 3, wherein the rotating shaft is integrally attached to the lifting handle.

6. The hydraulic lifting device as claimed in claim 4, wherein the outboard section of the rotating shaft has a threaded hole and an axial threaded hale on an end face thereat one end of the foot pedal has a raised cylindrical post, with an axial hole through the post, and on the inboard end of the post is a radial slot; wherein the pedal is attached to the rotating shaft and the pedal is allowed to move forward freely until a stud thereof hits an extreme end of the slot so as to be in a stowed non use position.

7. The hydraulic lifting device as claimed In claim 6, wherein the slot in the foot pedal cylindrical post has a selected cut angle.

8. The hydraulic lifting device as claimed in claim 6, wherein a washer is adjoined to the end face of the rotating shaft, and a screw is threaded into the threaded hole so that the foot pedal and the rotating shaft are combined coaxially.

9. The hydraulic lifting device as claimed in claim 6, wherein the stud is a pin rod.

10. A hydraulic lifting device capable of being rapidly raised in a mechanical movement by the use of a linkage mechanism, as claimed in claim 1, wherein a cross axial hole is formed in an extended outboard section of the rotating shaft; an auxiliary rod with an extending diameter is inserted into the cross hole of the rotating shaft; thereby, by moving the auxiliary rod the rotating shaft rotates and the linkage drives the lifting arm of the lifting device.

11. The hydraulic lifting device as claimed in claim 1, wherein a cylindrical post is inserted into the outboard end of the extended rotating shaft, and an auxiliary rod having a hole in a front thereof which fits over the cylindrical post, thereby, by moving the auxiliary rod the rotating shaft rotates and the linkage drives the lifting arm of the lifting device.

* * * * *